United States Patent [19]

Houston

[11] 3,924,862

[45] Dec. 9, 1975

[54] SEALING DEVICE AND METHOD OF FABRICATION THEREOF

[76] Inventor: Stanley M. Houston, 74 Scenic Drive, Orinda, Calif. 94563

[22] Filed: Mar. 26, 1973

[21] Appl. No.: 345,195

[52] U.S. Cl. .............................................. 277/231
[51] Int. Cl.² .......................................... F16J 15/24
[58] Field of Search ........... 277/192, 193, 225, 231, 277/233, 216, 235, 10, 229, 230

[56] References Cited
UNITED STATES PATENTS

| | | | |
|---|---|---|---|
| 711,761 | 10/1902 | Flinn.................................. | 277/231 |
| 1,271,526 | 7/1918 | Crane et al. ....................... | 277/229 |
| 1,776,911 | 9/1930 | Jones................................. | 277/231 |
| 3,123,367 | 3/1964 | Brummer et al.................... | 277/207 |

FOREIGN PATENTS OR APPLICATIONS

| | | | |
|---|---|---|---|
| 434,731 | 9/1935 | United Kingdom................. | 277/231 |

*Primary Examiner*—Robert I. Smith
*Attorney, Agent, or Firm*—Phillips, Moore, Weissenberger, Lempio & Strabala

[57] ABSTRACT

A sealing device disclosed herein provides sealing between the case of a gear box and the rotating shafts or journals associated therewith. The sealing device associated with each journal comprises two semi-circular sealing device portions, each being disposed in a groove defined by the gear box case and held in position thereby along a portion of the journal. Each sealing device portion is made up of an elongated resilient rubber carrier which seats directly in the associated gear case groove, and a felt portion disposed in a channel defined by the carrier and fixed thereto by means of stitching, and in sliding contact with the surface of the associated journal. An elongated metal rod is disposed within and along the carrier, so that each overall sealing device portion is substantially incompressible along its longitudinal axis. The groove and carrier seated therein, however, are configured in relation to each other to allow compression of the carrier inwardly of the groove. The described sealing device is used in association with a non-rotating journal surface also.

13 Claims, 10 Drawing Figures

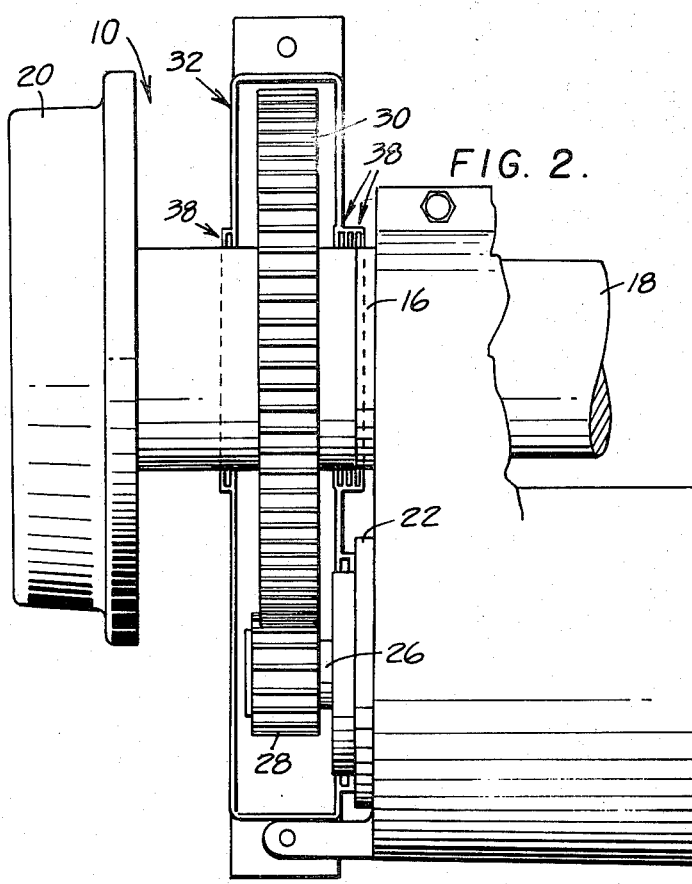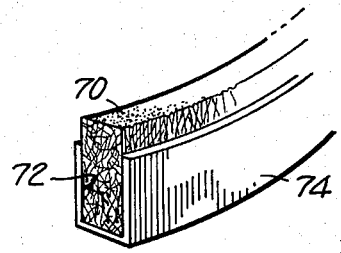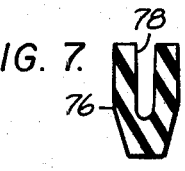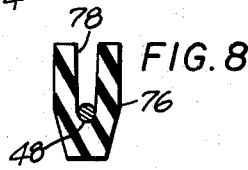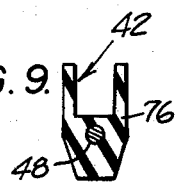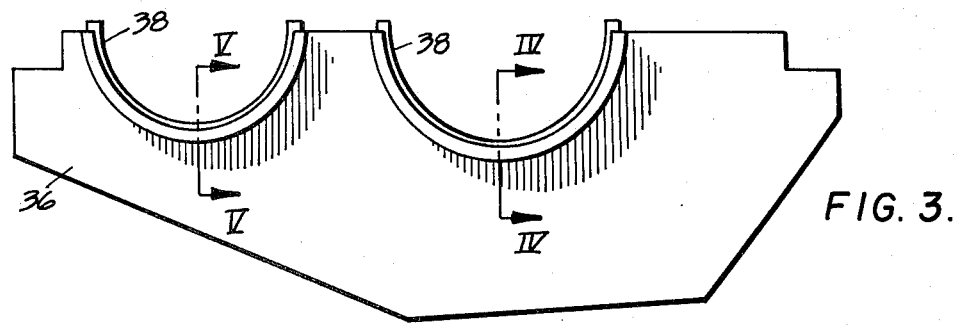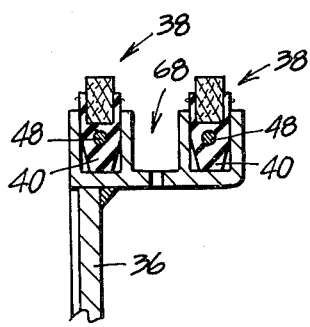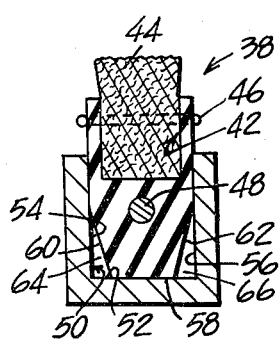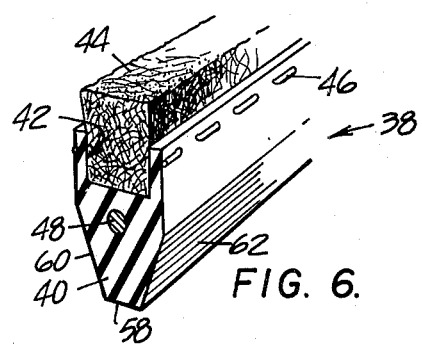

SEALING DEVICE AND METHOD OF FABRICATION THEREOF

BACKGROUND OF THE INVENTION

This invention relates to sealing devices, and more particularly, to a rubber-and-felt sealing device particularly for use in cooperation with a gear case.

In the type of locomotive which utilizes traction motors, each traction motor (of which there may be four or six used for driving the locomotive) includes a gear which is in driving engagement with another gear fixed to the shaft on which a wheel of the locomotive is mounted. Through such means, that wheel of the locomotive may be driven over a rail.

Generally, each pair of gears as described above is housed in a split gear case, and the gear case is filled with viscous oil to provide proper lubrication of the gears.

In the past, it has been extremely difficult to provide effective sealing between the gear case and the rotating shaft to which the drive wheel is mounted, and also between the gear case and the shaft or journal of the traction motor, to which the drive gear is mounted. The problem is quite acute because any sealing elements provided in such places will be subjected to a great amount of pounding, which is transferred from the rail through the locomotive wheel and to the shafts and gear case.

One conventional seal for use in this environment is made up of a metal channel in which is fixed a felt member. Such conventional seal is positioned so that the felt member thereof is in contact with the surface of the rotating shaft associated therewith. In such conventional seal, it has been found that the felt portion was subjected to and was required to absorb the relatively great pounding and vibration described above, and was subject to early failure, with resultant leakage of oil from the gear case.

SUMMARY OF THE INVENTION

It is an object of this invention to provide a sealing device for sealingly associating a gear case with rotatable shafts or journals associated with that case.

It is a further object of this invention to provide a sealing device which, while fulfilling the above object, overcomes the problems of the prior art sealing device by providing effective sealing over a relatively long period of operating time, even though being subjected to a relatively great amount of pounding and vibration.

It is a still further object of this invention to provide a sealing device which, while fulfilling the above objects, is extremely simple and economical in design and manufacture.

Broadly stated, the invention comprises a sealing device for providing sealing relation between itself and the surface of a member rotatable relative to the sealing device. The sealing device comprises an elongated resilient carrier disposed about a portion of the rotatable member and an elongated felt member fixed to and along the carrier and in sliding contact with the surface of the rotatable member with the carrier so disposed. Support means are included for supporting the carrier in said position disposed about the portion of the rotatable member.

Broadly stated, a method of fabricating such seal is herein disclosed. Such method comprises providing an elongated resilient member defining an elongated channel, depositing an elongated metal rod in the channel, repositioning a portion of the material of the elongated resilient member over and along the rod, disposing an elongated felt member in the channel, and fixing the felt member to the elongated resilient member.

BRIEF DESCRIPTION OF THE DRAWINGS

These and other objects of the invention will become apparent from a study of the following specification and drawings, in which:

FIG. 2 is a plan view, partially broken away, of the apparatus of FIG. 1;

FIG. 3 is a side elevation of the lower gear case portion of the apparatus, with the sealing devices associated therewith in place;

FIG. 4 is a sectional view taken along the line IV—IV of FIG. 3;

FIG. 5 is a sectional view taken along the line V—V of FIG. 3;

FIG. 6 is a perspective view of the sealing device;

FIGS. 7, 8 and 9 are views showing the method of fabricating the sealing device; and FIG. 10 is a perspective view of a conventional sealing device as known in the prior art.

DESCRIPTION OF THE PREFERRED EMBODIMENT

Figure 1:
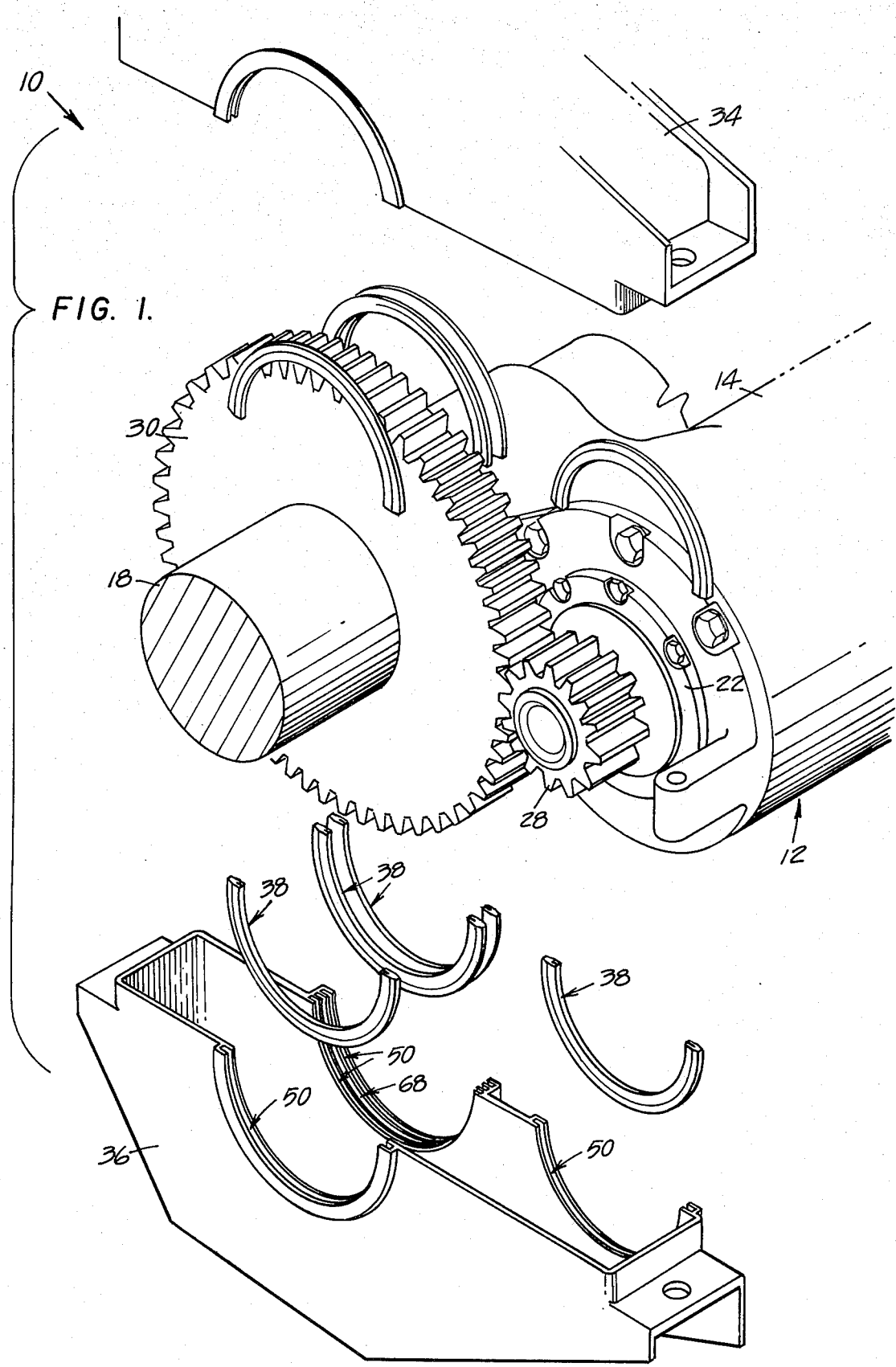
FIG. 1 is an exploded perspective view of the apparatus incorporating the inventive sealing device.

Apparatus 10 incorporating the invention is shown generally in FIGS. 1 and 2. The apparatus 10 is associated with a locomtive (not shown) and includes a traction motor 12 which may be one of a plurality thereof associated with the locomotive. The motor 12 is supported in a casing 14 fixed relative to the locomotive, the casing 14 also supporting a bearing 16 which in turn supports a shaft 18. Shaft 18 is rotatable within the bearing 16, and has fixed to its end a wheel 20 for rolling on a rail (not shown). It will be understood that shaft 18 extends across the locomotive, and the opposite end thereof is also supported by a like bearing and has a wheel mounted thereon for rolling on another rail. The motor 12 has fixed relative thereto a journal 22, in which is rotatably supported an output shaft 26.

An output gear 28 is fixed to the extending end of the shaft 26 as shown. Such output gear 28 is in engagement with a gear 30 fixed to the shaft 18, so that the motor 12 will drive the wheel 20 to transport the locomotive along the track.

The gears 28,30 are housed in a gear case 32 made up of upper and lower portions 34,36. A sealing device 38 of the type used in providing sealing between the gear case 32 and the associated shafts or journals is shown most clearly in FIGS. 5 and 6. As shown therein, the sealing device 38 includes an elongated rubber resilient carrier 40. The carrier defines an elongated channel 42. Positioned within the channel 42 and along the carrier 40 is an elongated flat member 44, which is fixed to and along the carrier 40 by means of stitching 46. The felt member 44 extends beyond the carrier 40 outward of the channel 42. An elongated metal rod 48 is disposed within and along the carrier 40, so that the carrier 40 is substantially incompressible along its longitudinal axis. However, the metal rod 48 is bendable, so that the entire sealing device 38 may be bent to a desired shape.

The gear case 32 is provided with a plurality of semicircular grooves 50 into which the sealing devices 38 are disposed, as shown. The gear case portions 34,36 act as support members for the carriers 40 of the sealing devices 38. It is to be noted that each groove 50 defines a substantially flat base 52, and a pair of upwardly extending walls 54,56 substantially perpendicular to the base 52. The cross-sectional shape of the carrier 40 which fits therein is carefully chosen as shown in FIGS. 4,5 and 6. The carrier defines a substantially flat base 58 which is in contact with the base 52. However, the carrier sides 60,62 taper inwardly of each other in the direction of the base 58 (inwardly of the groove 50). Thus, spacings 64,66 are provided between side 60 and corresponding wall 54, and also between side 62 and corresponding wall 56. These spacings 64,66 allow compression of the resilient carrier 40 inwardly of the groove 50, the importance of which will be described in detail.

When assembling the gear case 32 about the gears 28,30, the sealing devices 38 are sized length-wise to extend a small distance at each end beyond the associated case portion 36, as shown in FIG. 3. Likewise, the sealing devices 38 associated with the case portion 34 are sized to extend at each end a small distance beyond the case portion 34. This is done so that, upon assembly of the two case portions 34,36, the extending ends of corresponding sealing devices 38 contact each other, and the resilient carriers 40 are forced downwardly into their respective grooves 50 (this being allowed by the spacings 64,66 described above between the sides 60,62 of the carrier 40 and the walls 54,56 of the associated groove 50), to provide proper seating of each carrier 40 in its associated groove 50 and proper sealing relation therebetween. (It is to be remembered that each sealing device 38 is substantially incompressible along its longitudinal axis because of the metal rod 48 embedded in the carrier 40 thereof. Consequently, forces placed on the extended ends of the sealing device 38 must compress the carrier 40 into the groove 50). After such seating, however, spacings 64,66 still exist, to allow for further compression of each sealing device 38 further into its groove 50.

With the gear case portions 34,36 so positioned and fixed together, the carrier 40 of each seal device 38 is disposed along a portion of a journal or shaft associated therewith, and the felt member 44 is in contact with the surface of the journal or shaft. In the case of a sealing device associated with the motor 12, the felt member 44 is in non-sliding contact with the surface of the journal 22, to provide sealing between itself and the surface of the journal 22. In the case of the shaft 18, the felt member 44 of each sealing device 38 adjacent gear 30 on either side thereof is in sliding contact with the surface of the rotatable shaft 18. The felt member 44 of a sealing device 38 removed from the gear 30 is in contact with the surface of the bearing 16, with no sliding contact involved. The adjacent pair of sealing devices 38 on one side of the gear 30 is shown in FIG. 4 include a drainage groove 68 therebetween defined by the gear case portion 36.

The gear case 32 is then filled with viscous oil and the motor 12 driven as is well known.

The particular shape and construction of the sealing device 38 has been found to promote effective sealing over a relatively long period of operation. Such particular construction provides extremely great seal strength and resiliency. The particular shape of the carrier 40, (particularly the shape of the sides 60,62 in relation to the walls 54,56 of the groove 50) allows the rubber carrier 40 to recoil under vibration and pounding inwardly of its associated groove 50, so that the felt member 44 thereof is not damaged by such vibration.

In the prior art device shown in FIG. 10, a felt member 70 was glued into a channel 72 of a metal holder 74. In such sealing device, the felt member 70 thereof was itself subjected to the pounding and vibration described above, resulting in early failure of the sealing device.

In FIGS. 7, 8 and 9 are illustrated a method of fabricating the inventive sealing device 38 described above. Initially, an elongated resilient rubber member 76 in the shape shown in FIG. 7 is provided. The member 76 defines an elongated channel 78 into which is deposited a metal rod 48. The member 76 is then compression-molded, and during such process, some of the material defining the channel 78 flows and is repositioned over and along the rod 48. The remainder of channel 78 now existing defines channel 42. An elongated felt member 44 is then disposed in the channel 42 and is fixed to the elongated rubber member 76 by means of stitching 46 as shown (FIG. 6).

It will be seen that such method of fabricating the inventive sealing device 38 is extremely simple and effective.

What is claimed is:

1. A sealing device for providing sealing relation between itself and a surface of a member comprising:
    an elongated resilient elastomeric carrier which may be disposed about a portion of the member; and
    an elongated felt member fixed to and along the carrier and which may contact the surface of the member with the carrier so disposed;
    wherein the carrier defines a base, and a pair of carrier sides tapered inwardly of each other in the direction of the base.

2. The sealing device of claim 1 and means associated with the carrier for providing that said carrier is substantially incompressible along its longitudinal axis.

3. The sealing device of claim 2 wherein the means associated with the carrier for providing that said carrier is substantially incompressible along its longitudinal axis comprise an elongated metal rod disposed within and along said carrier.

4. The sealing device of claim 3 wherein the carrier comprises a resilient carrier defining a carrier channel, and wherein the felt member is fixed within the channel and extends beyond the carrier outward of the channel.

5. The sealing device of claim 4 and comprising support meaans for supporting the carrier in said position disposed about the portion of the member, wherein the support means comprise a support member defining a groove, the carrier being disposed in said groove.

6. The sealing device of claim 5 wherein, with the carrier disposed in the groove, spacing is provided between at least one groove surface and a corresponding adjacent carrier surface to allow compression of the carrier inwardly of the groove.

7. The sealing device of claim 3 wherein the felt member is fixed to and along the carrier by means of stitching.

8. The sealing device of claim 1 wherein the carrier comprises a resilient carrier defining a carrier channel, and wherein the felt member is fixed within the channel and extends beyond the carrier outwardly of the channel.

9. The sealing device of claim 8 and comprising support means for supporting the carrier in said position disposed about the portion of the member, wherein the support means comprise a support member defining a groove, the carrier being disposed in said groove, and wherein, with the carrier disposed in said groove, space is provided between at least one groove surface and a corresponding adjacent carrier surface to allow compression of the carrier inwardly of the groove.

10. The sealing device of claim 9 wherein the felt member is fixed to and along the carrier by means of stitching.

11. A sealing device for providing sealing between a gear case and a member rotatable relative to the gear case comprising:
- a resilient rubber elongated carrier which may be disposed in a groove defined by the gear case, and positionable thereby along a portion of the rotatable member, said carrier defining a carrier channel; and
- an elongated felt member fixed to and along the carrier within the channel thereof, and positionable to be in sliding contact with the surface of the rotatable member with the carrier so disposed;
- further comprising said groove, and wherein the groove defines a substantially flat base and a pair of upwardly extending walls, and wherein the carrier defines a portion thereof in contact with the base of the groove, but defining carrier sides being tapered inwardly of each other in the direction inwardly of the groove, so that spacing is provided between each side of the carrier and the adjacent groove wall, to allow compression of the carrier inwardly of the groove.

12. The sealing device of claim 11 and means associated with the carrier for providing that said carrier is substantially incompressible along its longitudinal axis, comprising an elongated metal rod disposed within and along said carrier.

13. The sealing device of claim 11 wherein the felt member is fixed to and along the carrier by means of stitching.

* * * * *